(12) United States Patent
Blackmore et al.

(10) Patent No.: US 7,810,969 B2
(45) Date of Patent: Oct. 12, 2010

(54) AMBIENT LIGHTING FOR VEHICLE INTERIOR FLOOR CONSOLE

(75) Inventors: Kathleen Blackmore, Northville, MI (US); Cornel Gardner, Romulus, MI (US); Mike Whitens, Novi, MI (US); Michael Williams, Northville, MI (US); Peter Bejin, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/591,719

(22) Filed: Nov. 2, 2006

(65) Prior Publication Data
US 2008/0122241 A1  May 29, 2008

(51) Int. Cl.
*B60Q 1/00* (2006.01)
(52) U.S. Cl. .................. 362/459; 362/555; 362/480
(58) Field of Classification Search ............. 362/551, 362/555, 559, 459, 479–485, 487–489, 491
See application file for complete search history.

(56) References Cited

U.S. PATENT DOCUMENTS

| | | | |
|---|---|---|---|
| 5,106,143 A * | 4/1992 | Soeters .................. 296/37.8 |
| 5,671,996 A | 9/1997 | Bos et al. |
| 5,903,104 A | 5/1999 | Kojima |
| 5,938,321 A | 8/1999 | Bos et al. |
| 6,203,088 B1 | 3/2001 | Fernandez et al. |
| 6,419,379 B1 * | 7/2002 | Hulse ..................... 362/488 |
| 6,550,940 B2 | 4/2003 | Kamiya et al. |
| 6,713,967 B1 | 3/2004 | Gaynier et al. |
| 6,733,166 B2 | 5/2004 | Hulse |
| 6,935,763 B2 | 8/2005 | Mueller et al. |
| 6,994,455 B2 | 2/2006 | Okabe et al. |
| 7,048,423 B2 | 5/2006 | Stepanenko et al. |
| 7,076,877 B2 | 7/2006 | Wieschermann et al. |
| 7,104,580 B2 * | 9/2006 | Clark et al. ............. 296/24.32 |
| 2006/0022478 A1 * | 2/2006 | DeLong et al. ........... 296/37.8 |
| 2006/0071497 A1 * | 4/2006 | Radu et al. .............. 296/24.34 |
| 2006/0085940 A1 * | 4/2006 | Chernoff .................... 15/313 |
| 2006/0097121 A1 * | 5/2006 | Fugate ..................... 248/311.2 |
| 2006/0231716 A1 * | 10/2006 | Liu et al. ................. 248/311.2 |

FOREIGN PATENT DOCUMENTS

JP         2005132367         5/2005

* cited by examiner

*Primary Examiner*—Jong-Suk (James) Lee
*Assistant Examiner*—Julie A Shallenberger
(74) *Attorney, Agent, or Firm*—Shook, Hardy & Bacon L.L.P.

(57) ABSTRACT

A floor console to provide ambient lighting in the interior of a vehicle is disclosed. The floor console includes lighting elements strategically positioned to illuminate the footwells of the vehicle, the cupholders, and the storage bin. The same lighting element may be used to illuminate one or more of the cupholders and the storage bin. The preferred lighting element is an LED while other lighting elements may be used. The floor console is also provided with wiring and an ECU and may be readily connected to the vehicle's power system.

14 Claims, 5 Drawing Sheets

AMBIENT LIGHTING FOR VEHICLE INTERIOR FLOOR CONSOLE

TECHNICAL FIELD

The present invention relates generally to interior lighting systems for motor vehicles. More particularly, the present invention relates to an interior lighting system integrated with the floor console of a motor vehicle which provides ambient lighting.

BACKGROUND OF THE INVENTION

Modern vehicle interiors are provided with lights for the safety and comfort of the driver and passengers. In its simplest configuration, vehicle interior lighting is provided in the form of a dome lamp mounted in the approximate center of the vehicle ceiling. While typically providing functional and adequate lighting, the dome lamp arrangement creates shadows and leaves many areas of the interior without direct illumination.

In an effort to improve vehicle interior lighting, additional lights have been included in a variety of places. For example, lights have been fitted to the underside of instrument panels as well as under vehicle seats to illuminate the floor and footwells. Lights have also been fitted to utilitarian areas such as cup holders. Unlike the dome light arrangement, these lights provide indirect or ambient lighting to the vehicle interior. Such ambient lighting may be configured to provide light to almost all areas left dark by conventional dome lights, thus adding to comfort and safety.

While providing an improvement in vehicle lighting, known ambient lighting typically adds complexity in the forms of lighting elements (tubes, bulbs, or light emitting diodes [LEDs]), switches, controllers, and wiring. According to known arrangements, a relatively large number of discrete components are required to provide the desired level of lighting. In one known vehicle, in addition to a relatively complex web of wiring, thirteen discrete components are needed—four light tubes, two switches, one ECU (electronic control unit) and six LED assemblies.

Regardless of the design, according to current technology several individual ambient lighting components are disposed at various strategic locations in the interior, thereby complicating assembly of the vehicle as a whole. Specifically, wiring for under-seat lights must be installed before the vehicle carpet is installed. Light elements for both under-instrument panel and under-seat lights must be installed before the instrument panel or the seat is installed in the vehicle. This installation arrangement is cumbersome for assembly processes and adds significant expenses in both the planning and execution of vehicle assembly. In an effort to reduce the scheduling and planning burdens, some of these components, such as the wiring harness, are installed in the vehicle whether or not the customer orders optional ambient lighting, thus adding to vehicle cost.

To a certain extent the application of ambient lighting systems has been simplified by assemblies offered in the aftermarket where ambient lighting packages for vehicle interiors are available. These systems, however, are difficult to install and require that the necessary wiring be spliced at inconvenient areas, such as at the cigarette lighter for footwell lighting and at the PRNDL (park, reverse, neutral, drive, low) mechanism for cupholder lighting.

Accordingly, as in so many areas of vehicle design, an improved method of providing vehicle lighting is desired.

SUMMARY OF THE INVENTION

The present invention represents an advancement in the art of interior vehicle lighting by providing an ambient lighting system for a vehicle which comprises a floor console having integral lighting elements, wiring harness, connectors and an ECU. According to the present invention, the floor console may be configured and employed so as to provide all of the lighting needed to effect a complete, comfortable and inviting ambient lighting environment within a vehicle, rendering unnecessary the need for other interior lighting. The floor console of the present invention may be built by an outside supplier and installed by the vehicle builder during final assembly without the vehicle builder having to plan for or install in advance under-carpet wiring, lighting elements, and control elements (such as an ECU) at other locations in the vehicle interior as is required by the prior art.

The floor console of the present invention includes ambient lighting elements strategically positioned to illuminate the front footwells of the vehicle as well as the rear footwells. In the event that the floor console is provided with cupholders separate ambient lighting elements may be provided for the cupholders as well. In addition, the floor console may include one or more storage bins which may also be lighted by the console lights. In one embodiment a cupholder is removably mounted in a storage bin of the floor console, allowing the vehicle operator and passenger access to the bin once the cupholder is removed. According to this arrangement a single, dual-function lighting element may be used to illuminate both the removable cupholder and the storage bin.

The floor console may be constructed as a two-piece unit which includes a base and an upper portion that is attachable to the base. The upper portion is preferably attached to the base after the base is installed in the vehicle interior. Alternatively, the floor console may be constructed as a single, integrated component. In either embodiment, the related wiring harness and connectors are installed inside the floor console as are the necessary control elements, such as an ECU. For the sake of assembly efficiency, a single conduit is preferred to connect the console to the vehicle's power system. Overall the number of required components is reduced compared with conventional ambient lighting arrangements.

The several lighting elements are preferably LEDs, although other lighting elements such as tube and bulb elements may be used in the alternative or may be used in combination with LEDs.

The console of the present invention provides the vehicle manufacturer with a simplified and cost-reducing way of adding ambient lighting to the interior of the vehicle. By providing a console having integral ambient lighting elements, the need to install wiring, conduits and lighting elements in other locations in the vehicle interior at multiple stages of assembly is eliminated. This reduces inconvenience and costs at both the planning and assembly stages. The component cost is further reduced by using fewer lighting elements to effect good illumination such as having cupholders and the storage bin both illuminated by the dual-function lighting element. In addition, the console of the present invention may be provided as an attractive after-market feature which may used to replace the factory-installed standard console.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
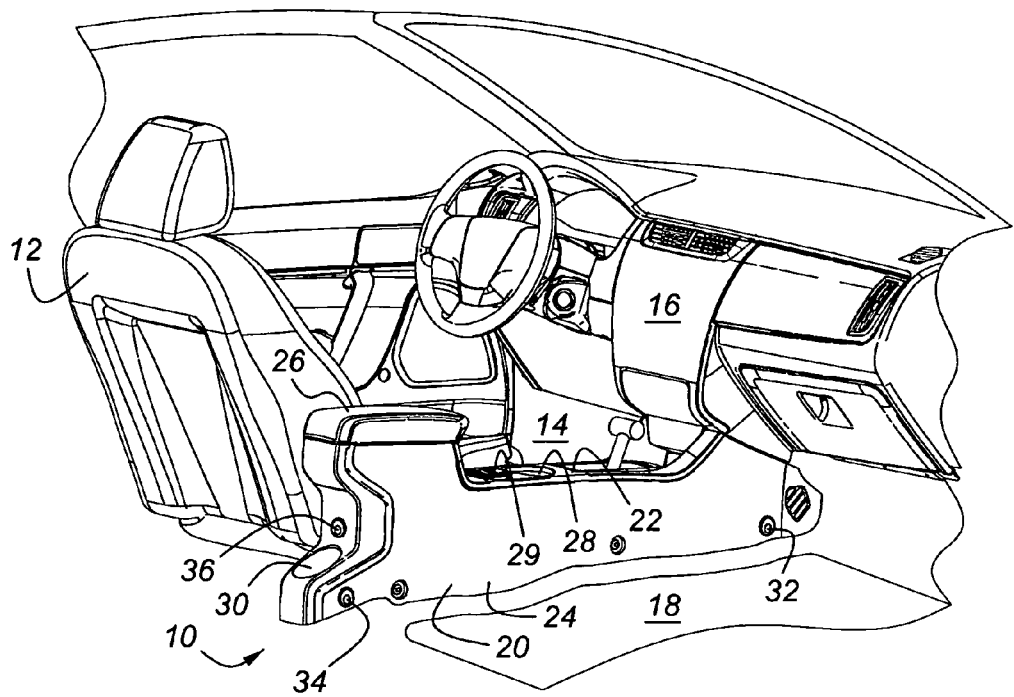
FIG. 1 illustrates a partial view of a vehicle's interior and the floor console according to the present invention.

In the following figures, the same reference numerals are used to refer to the same components. In the following description, various operating parameters and components are described for one constructed embodiment. These specific parameters and components are included as examples and are not meant to be limiting.

With reference to FIG. 1, a partial view of the interior of a vehicle, generally illustrated as 10, is shown. This view of the vehicle interior 10 shows a driver's seat 12, a driver's footwell 14, an instrument panel 16, a passenger's footwell 18, and a floor console 20. According to the illustrated first preferred embodiment, the console 20 includes a floor console top finish panel 22 and a floor console base 24. An armrest 26 is attached to the floor console base 24. A set of cupholders in the form of a forward cupholder 28 and a rearward cupholder 29 is provided in the floor console top finish panel 22 for use by the driver and passenger. A rear cupholder 30 is provided adjacent the end of the floor console base 24 for use by the rear passengers.

The present invention incorporates a number of lighting elements into the floor console 20. The LED module is the preferred lighting element for the present invention. The LED module provides a high degree of luminosity while drawing a relatively small amount of power. The LED module is also relatively small and inexpensive and has a long life. However, it is to be understood that while LED modules are shown and discussed hereafter as the preferred lighting element for the present invention, other known lighting elements, such as tubes or bulbs, may be substituted for the LED modules, or any of these lighting elements may be used in combination.

The illustrated LED modules include a right front footwell LED module 32 and a right rear footwell LED module 34. A rear cupholder LED module 36 is also provided. As is known in the art, the light emitted from the LED modules 32 and 34 (and from all of the LED modules noted herein) may be directed as desired to illuminate a particular area of the vehicle interior. For example, the LED modules 32 and 34 may be adjusted so that the emitted light faces downward toward the footwells.

Figure 2:
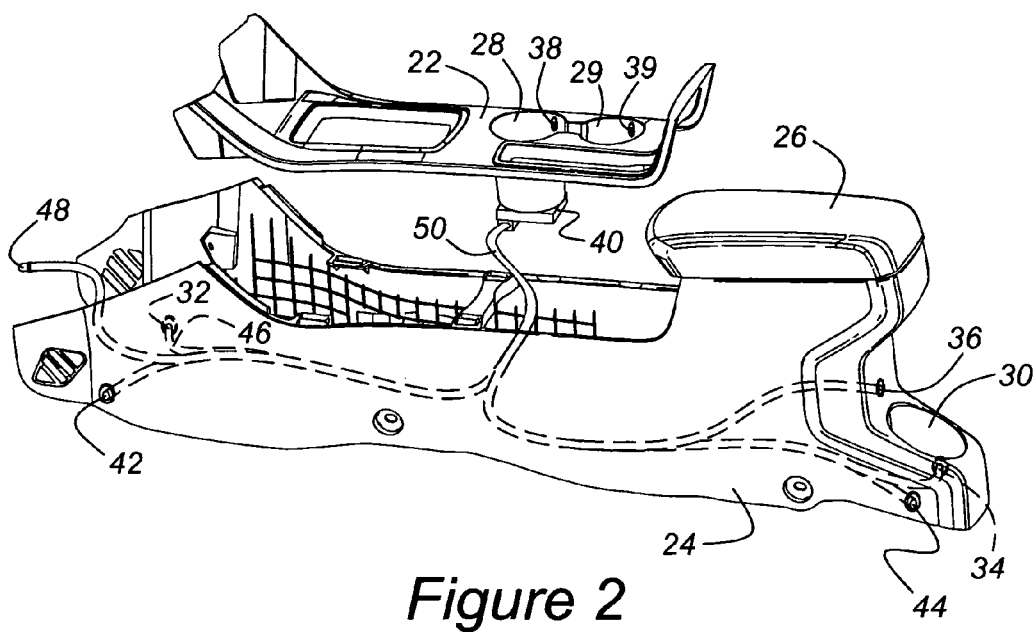
FIG. 2 illustrates an exploded view of the first preferred embodiment of the present invention showing the floor console top finish panel separated from the floor console base.

Referring to FIG. 2, an exploded view of the first preferred embodiment of the present invention shown in FIG. 1 is illustrated. According to this view the floor console top finish panel 22 is separated from the floor console base 24. On assembly, the floor console base 24 is attached to the vehicle floor and the appropriate electrical connection is made to the main wiring harness of the vehicle. Thereafter the floor console top finish panel 22 is installed on the floor console base 24 by fastening in a known manner.

As noted above in FIG. 1, the floor console top finish panel 22 includes the forward cupholder 28 and the rearward cupholder 29. The placement of the forward cupholder 28, the rearward cupholder 29, and the rear cupholder 30 shown in FIG. 2 is for illustrative purposes only, as the position, number and configuration of the cupholders can be changed as desired without deviating from the spirit of the present invention. For example, the cupholders may be of the fold-out type that is known in the art. Regardless of placement or configuration, the forward cupholder 28 is fitted with an LED module 38 to provide illumination for occupant convenience. The rearward cupholder 29 is fitted with an LED module 39. The LED modules 38 and 39 are electrically connected to an LED control module 40. While the LED modules 38 and 39 are shown positioned at the rearward end of their respective cupholders 28 and 29, the modules may be positioned elsewhere relative to the cupholders.

The floor console base 24 is substantially hollow as illustrated in FIG. 2 and as known in the art to accommodate the tunnel ordinarily present on the vehicle's floor. As stated above with respect to FIG. 1 and as illustrated therein, the floor console base 24 includes the right front footwell LED module 32, the right rear footwell LED module 34, and the rear cupholder LED module 36. These lighting elements are also illustrated in FIG. 2. Additional lighting elements are illustrated in FIG. 2 as well, and these include a left front footwell LED module 42 and a left rear footwell LED module 44.

A console base wiring harness 46 is provided to electrically interconnect the right front footwell LED module 32, the right rear footwell LED module 34, the rear cupholder LED module 36, the left front footwell LED module 42 and the left rear footwell LED module 44. The console base wiring harness 46 includes a connector 48 for connection with the vehicle's main wiring harness (not shown). The connector 48 may be of the snap-fit type of connector to provide for a quick and definite connection of the console base wiring harness 46 to the vehicle's main wiring harness.

A power line 50 is provided to electrically connect the console base wiring harness 46 to the LED control module 40 mounted on the floor console top finish panel 22. The power line 50 provides electrical power to the LED control module 40 and to the LED modules 38 and 39 according to the illustrated embodiment. Other LED modules (not shown) may be powered as well.

Figure 3:
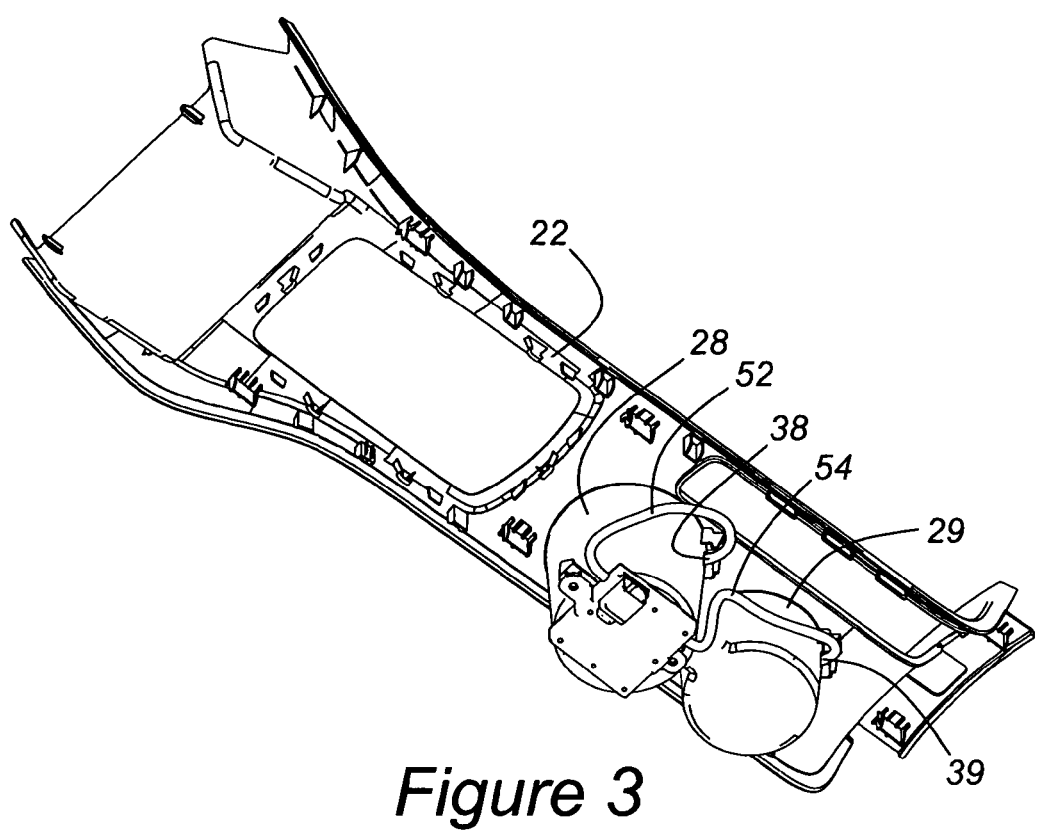
FIG. 3 illustrates a back side view of the floor console top finish panel shown in FIG. 2.
Figure 4:
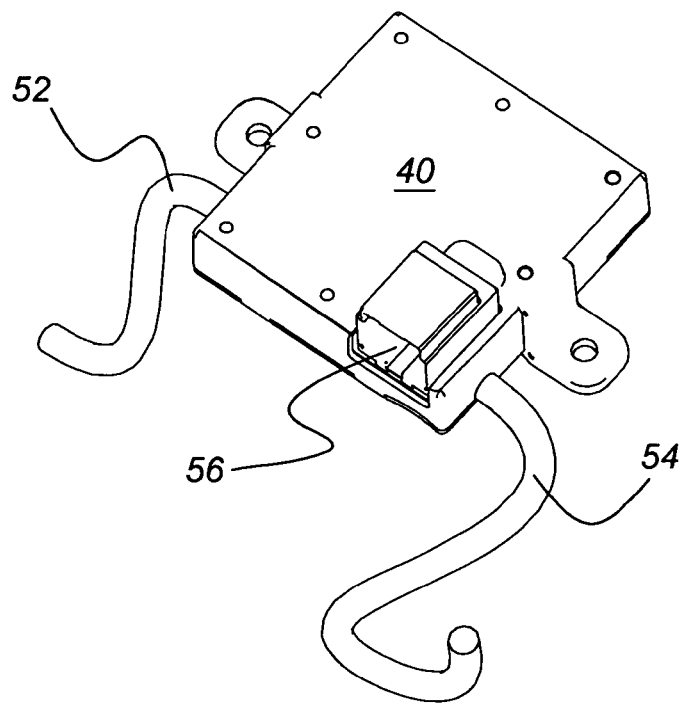
FIG. 4 illustrates an isometric view of the lighting module for the present invention.

The underside of the floor console top finish panel 22 is illustrated in FIG. 3. With reference thereto, a power line 52 connects the LED control module 40 with the LED module 38. Similarly, a power line 54 connects the LED control module 40 with the LED module 39. The power lines 52 and 54 are illustrated in relation to the LED control module 40 in detail in FIG. 4. This figure also illustrates a connector 56 to which the power line 50 of the console base wiring harness 46 is connected.

Figure 5:
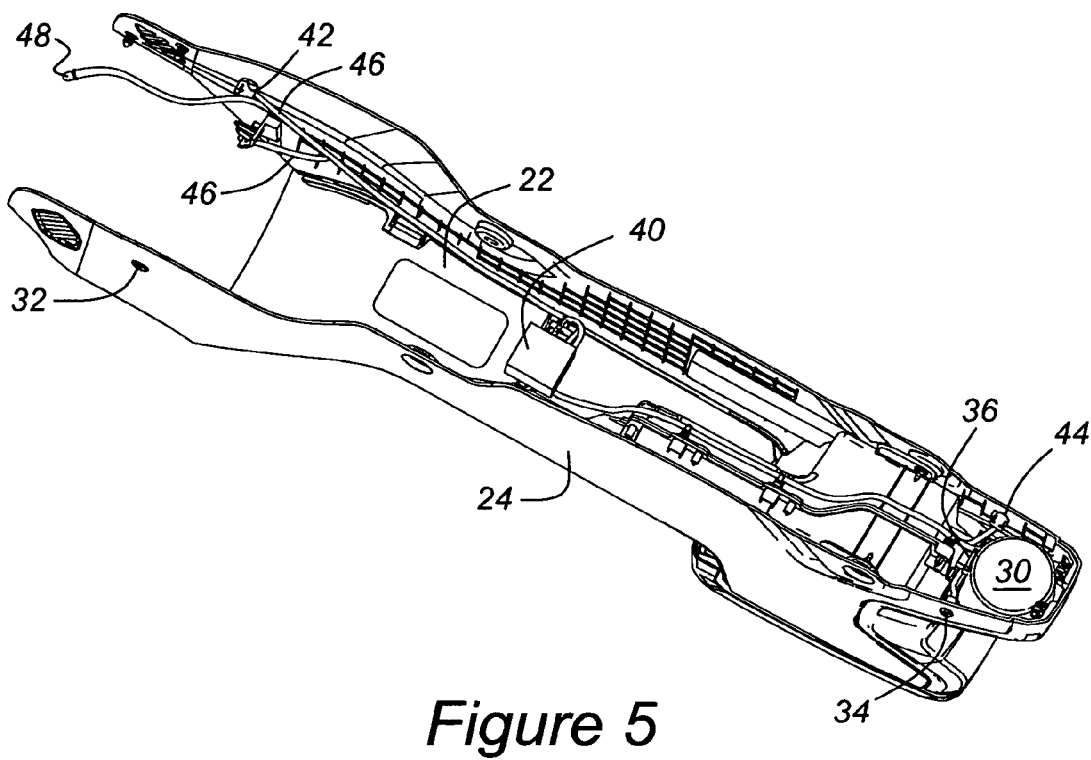
FIG. 5 illustrates a back side view of the floor console base and floor console top finish panel combination.

A backside view of the assembled floor console 20 is shown in FIG. 5. With reference thereto, it may be easily seen how the complete ambient lighting system of the present invention is contained entirely within the confines of the floor console 20. In addition to the internal operating components such as the LED control module 40, the console base wiring harness 46, and the connector 48, the array of LED modules 32, 34, 36, 38, 39, 42, and 44 is illustrated.

Figure 6:
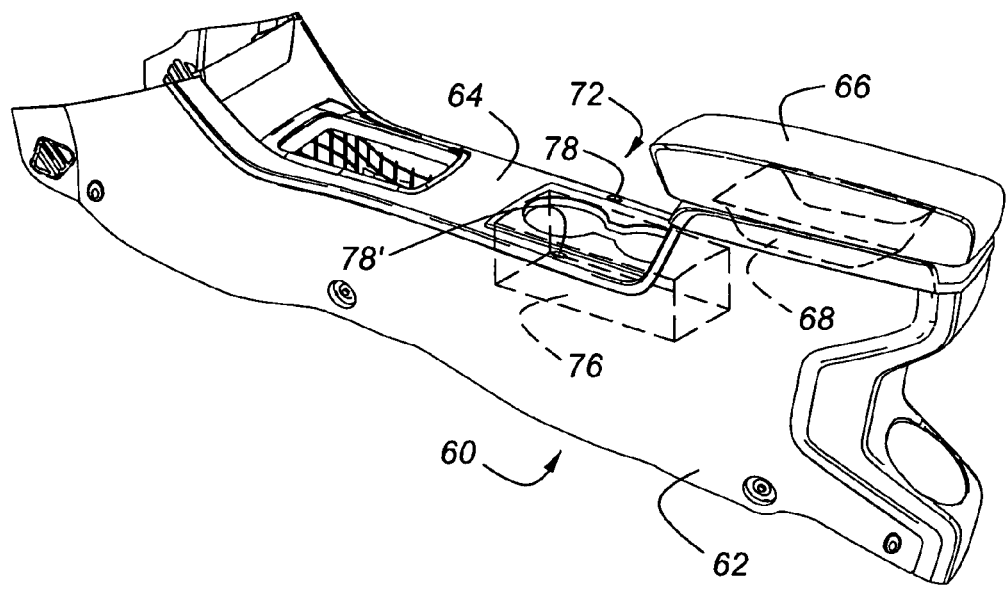
FIG. 6 illustrates an alternate embodiment of a portion of a floor console of the present invention.
Figure 7:
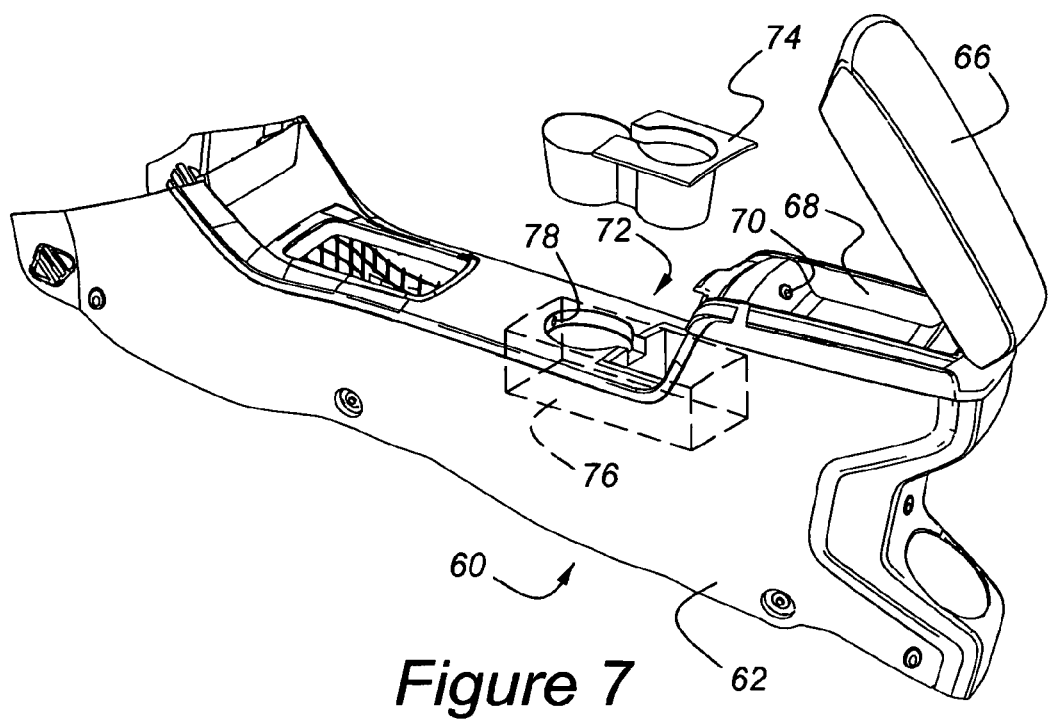
FIG. 7 illustrates the portion of the assembled floor console shown in FIG. 6 but shows the cupholder removed and spaced apart from the floor console and further illustrates the armrest in a raised position.

The present invention is highly adaptable and as such is subject to a variety of embodiments beyond that illustrated in FIGS. 1 through 5 and discussed above in relation thereto. One such adaptation is illustrated in FIGS. 6 and 7 in which a portion of an alternate embodiment of a floor console according to the present invention is illustrated. With reference thereto, a floor console, generally illustrated as 60, is shown in partial view. The floor console 60 includes a floor console body 62 and a floor console top finish panel 64 fitted to the floor console body 62.

The floor console 60 is fitted with a movable armrest 66 that is hingedly attached to the floor console body 62 in a known manner. The movable armrest 66 is illustrated in its lowered position in FIG. 6 and in its raised position in FIG. 7. An armrest storage bin 68 is disposed below the movable armrest 66. The armrest storage bin 68 is illustrated in broken lines in FIG. 6 and in partial solid and partial broken lines in FIG. 7. An LED module 70 is disposed within the armrest storage bin 68. The LED module 70 may be unswitched in which case it will always be on whenever it is powered or it may be selectively switched on or off by a switch (not shown) provided in operative relation to the movable armrest 66. Regardless of the embodiment, the LED module 70 provides light to the armrest storage bin 68.

The floor console 60 is also fitted with a storage bin and removable cupholder assembly, generally illustrated as 72. The storage bin and removable cupholder assembly 72 includes a removable cupholder 74 and a storage bin 76. The removable cupholder 74 is illustrated in its installed position in FIG. 6 and in its removed position in FIG. 7. The storage bin 76 is illustrated in broken lines in FIG. 6 and in partial solid and partial broken lines in FIG. 7.

A dual function LED module 78 is fitted to the floor console 60 at a position that is adjacent to the removable cupholder 74. The dual function LED module 78 is flush-mounted to allow removal of the removable cupholder 74. According to this arrangement, when the removable cupholder 74 is in its installed position as shown in FIG. 6, the dual function LED module 78 illuminates the removable cupholder 74. When the removable cupholder 74 is removed as illustrated in FIG. 7, the dual function LED module 78 illuminates the storage bin 76. It is to be understood that a greater number of LED modules may be used to provide effective illumination of the storage bin and removable cupholder assembly 72.

Figure 8:
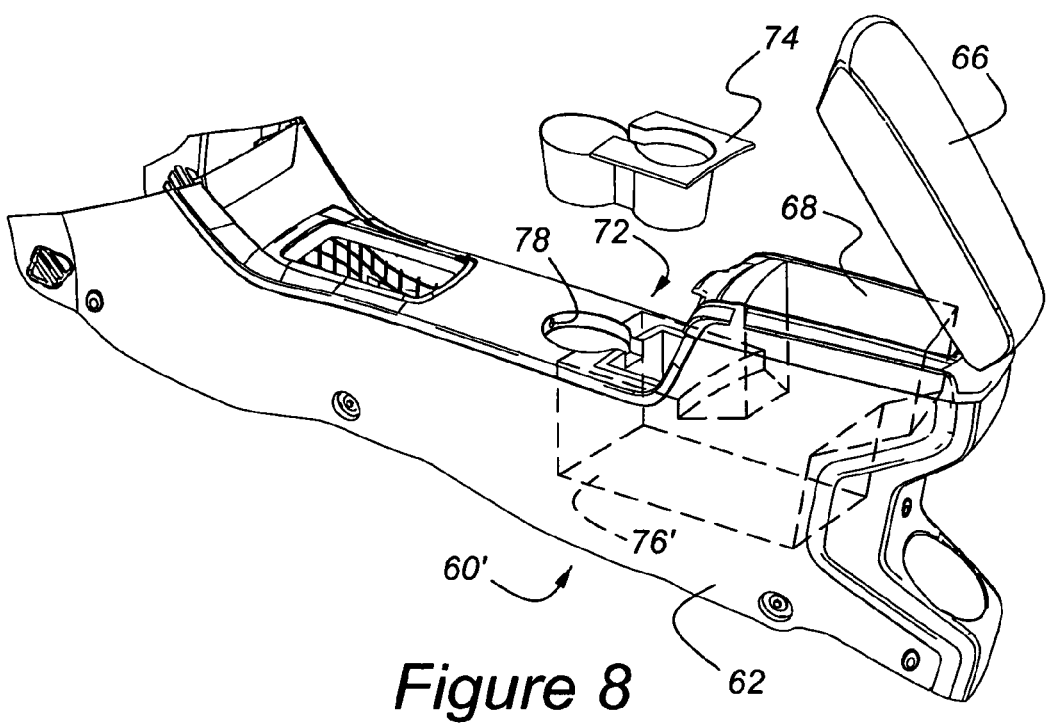
FIG. 8 illustrates an alternate embodiment of the assembled floor console of FIGS. 6 and 7, also showing the armrest in its raised position.

The console of the present invention may be further modified to provide expanded storage space as shown in FIG. 8. With reference to that figure, a console 60' includes an enlarged storage bin 76' that is common to both the area beneath the removable cupholder 74 and to the area beneath the armrest 66. This arrangement allows for increased storage space. As with the configuration shown and discussed above relative to FIGS. 6 and 7, the dual function LED module 78 illuminates the storage bin 76'.

Figure 9:
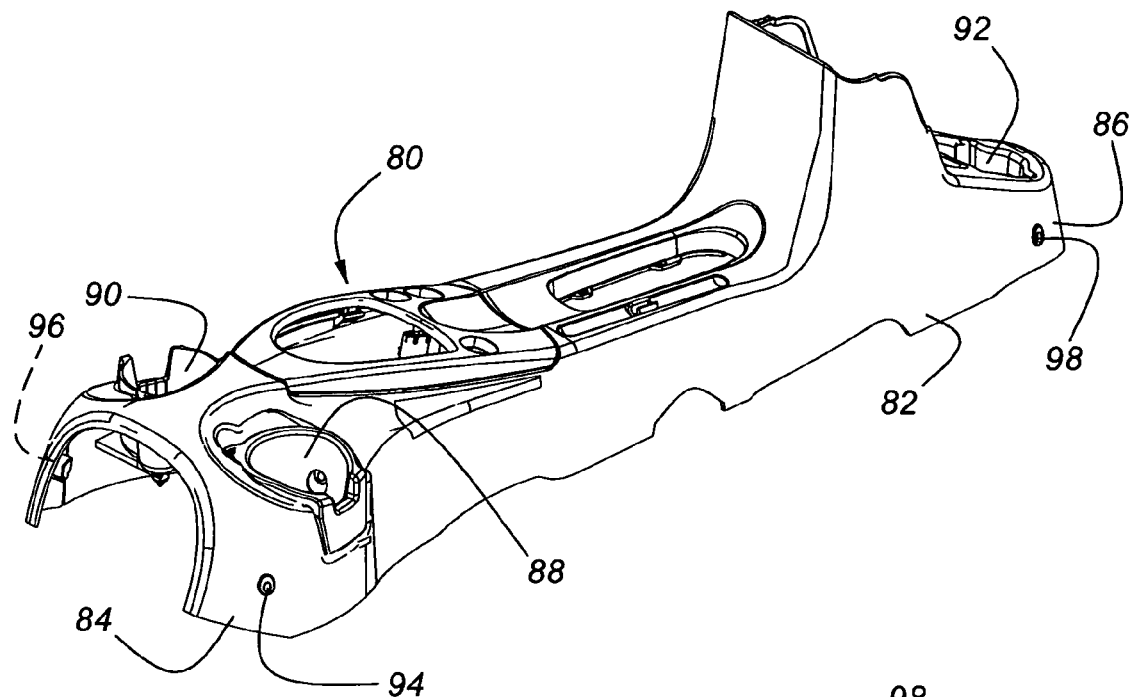
FIG. 9 illustrates an isometric view of the top side of a floor console according to a second preferred embodiment of the present invention.
Figure 10:
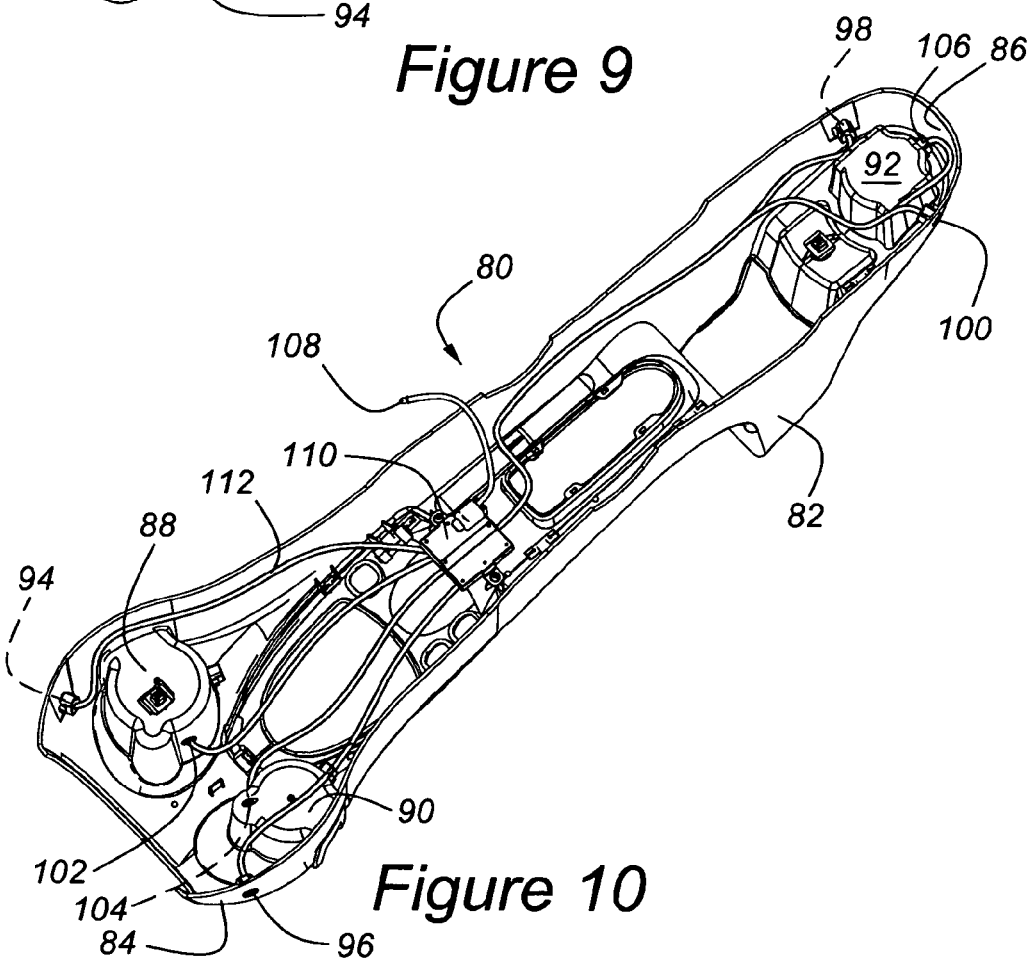
FIG. 10 illustrates an isometric view of the back side of the floor console shown in FIG. 9.

A further variation of the ambient lighting system is illustrated in FIGS. 9 and 10 in which a single piece floor module, generally illustrated as 80, is shown. An isometric topside view of the floor module 80 is illustrated in FIG. 9. An isometric backside view of the floor module 80 is illustrated in FIG. 10.

The single piece floor module 80 is similar in design and function to the floor module 20 shown in FIGS. 1 through 5 and discussed above in conjunction therewith, but does not include a separate top finish panel. The floor module 80 includes a floor console body 82 having a front end 84 and a back end 86. A left side cupholder 88 is formed in the left side of the front end 84 of the floor console body 82. In addition, a right side cupholder 90 is formed in the right side of the front end 84 of the floor console body 82. A rear cupholder 92 is provided at the back end 86 of the floor console body 82. It is to be understood that the number and arrangement of the cupholders 88, 90, and 92 is shown for illustrative purposes only and that a greater or lesser number of cupholders in different locations may be provided while keeping within the spirit of the present invention.

The embodiment shown in FIGS. 9 and 10 provides an array of ambient lighting elements. Specifically, a left front footwell LED module 94 is provided at the front end 84 of the floor console body 82. A right front footwell LED module 96 is also provided at the front end 84 of the floor console body 82. A left rear footwell LED module 98 is provided at the back end 86 of the floor console body 82. A right rear footwell LED module 100 is also provided at the back end 86 of the floor console body 82.

The cupholders 88, 90 and 92 each preferably has its own LED module. Accordingly, an LED module 102 is provided in conjunction with the left side cupholder 88 and an LED module 104 is provided in conjunction with the right side cupholder 90. Furthermore, a rear cupholder LED module 106 is provided in conjunction with the rear cupholder 92.

A main power system connector 108 is installed to provide electrical power to the floor module 80 from the vehicle's main power system. The vehicle's power is then directed to an LED control module 110 and is subsequently distributed to the LED modules 94, 96, 98, 100, 102, 104 and 106 by way of a console harness 112.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims. Specifically, and as noted above, the variety, position and number of lighting elements provided in conjunction with the floor console can be readily altered to meet the requirements of a specific application without deviating from the present invention.

What is claimed is:

1. A floor console assembly for use in a motor vehicle, the motor vehicle having a footwell and a main electrical system, the floor console assembly comprising:
    a console body having a cupholder and storage bin assembly, said cupholder and storage bin assembly including a removable cupholder and a storage bin, said storage bin having a cupholder-receiving opening defined over said storage bin, said removable cup holder being removably positionable on said cupholder-receiving opening of said storage bin;

a dual function cupholder ambient lighting element, said ambient lighting element being integrated with said console body, said dual function cupholder ambient lighting element being fitted in said console adjacent said cupholder-receiving opening of said storage bin assembly at a position whereby when said removable cupholder is in its installed position in said opening of said storage bin said dual function cupholder ambient lighting element illuminates said removable cupholder and when said removable cupholder is not in its installed position in said opening of said storage bin said dual function cupholder ambient lighting element illuminates said storage bin; and a console wiring harness integrated with said console body, said ambient lighting element being electrically connected with said console wiring harness, said console wiring harness being electrically attachable with the main electrical system of the motor vehicle.

2. The floor console assembly for use in a motor vehicle of claim 1, wherein said ambient lighting elements are selected from the group consisting of light emitting diodes and incandescent bulbs.

3. The floor console assembly for use in a motor vehicle of claim 1, the motor vehicle having a rear passenger area, said floor console assembly including a mar end adjacent the rear passenger area and a cupholder formed in said rear end, said floor console assembly further including a rear cupholder ambient lighting element positioned in said rear end of said floor console assembly.

4. A floor console assembly for use in a motor vehicle, the motor vehicle having a left footwell and a right footwell, the motor vehicle having a main electrical system, the floor console assembly comprising:

a console body;

a first ambient lighting element for illuminating the left footwell and a second ambient lighting element for illuminating the right footwell, said first ambient lighting element and said second ambient lighting element being integrated with said console body;

a storage bin formed in said console, said storage bin having a cupholder-receiving opening defined over said storage bin;

a removable cupholder removably positionable on said cupholder-receiving opening of said storage bin;

a dual function cupholder ambient lighting element for alternatively providing ambient illumination to said cupholder and to said storage bin, said ambient lighting element being fitted in said console adjacent said cupholder-receiving opening of said storage bin assembly at a position whereby when said removable cupholder is in its installed position in said opening of said storage bin said dual function cupholder ambient lighting element illuminates said removable cupholder and when said removable cupholder is not in its installed position in said opening of said storage bin said dual function cupholder ambient lighting element illuminates said storage bin; and a console wiring harness integrated with said console body, said first ambient lighting element and said second ambient lighting element being electrically connected with said console wiring harness, said console wiring harness being electrically attachable with the main electrical system of the motor vehicle.

5. The floor console assembly for use in a motor vehicle of claim 4, wherein said first ambient lighting element and said second ambient lighting element are selected from the group consisting of light emitting diodes and incandescent bulbs.

6. The floor console assembly for use in a motor vehicle of claim 4, wherein said cupholder ambient lighting element is selected from the group consisting of light emitting diodes and incandescent bulbs.

7. The floor console assembly for use in a motor vehicle of claim 4, the motor vehicle having a rear passenger area, said floor console assembly including a rear end adjacent the rear passenger area and a cupholder formed in said rear end, said floor console assembly further including a rear cupholder ambient lighting element positioned in said rear end of said floor console assembly.

8. The floor console assembly for use in a motor vehicle of claim 7, wherein said rear cupholder ambient lighting element is selected from the group consisting of light emitting diodes and incandescent bulbs.

9. The floor console assembly for use in a motor vehicle of claim 4, further including an ambient lighting element controller integrated with said console body and said console wiring harness.

10. The floor console assembly for use in a motor vehicle of claim 4, wherein said console body includes a floor console top finish panel and a floor console base, a floor console top finish panel ambient lighting element fitted in said floor console top finish panel and a floor console base lighting element fitted in said floor console base, and wherein said console wiring harness includes a top finish panel component and a console base component, said floor console top finish panel ambient lighting element being electrically associated with said top finish panel component and said floor console base lighting element being electrically associated with said console base component.

11. A floor console assembly for use in a motor vehicle, the motor vehicle having a driver's footwell, a passenger's footwell and a main electrical system, the floor console assembly comprising:

a console body;

a driver's footwell ambient lighting element for providing ambient illumination to the driver's footwell, and a passenger's footwell ambient lighting element for providing ambient illumination to the passenger's footwell, said ambient lighting elements being integrated with said console body;

a storage bin formed in said console body, said storage bin having a cupholder-receiving opening defined over said storage bin;

a removable cupholder removably positionable on said cupholder-receiving opening of said storage bin;

a dual function cupholder ambient lighting element for alternatively providing ambient illumination to said cupholder and to said storage bin, said ambient lighting element being fitted in said console adjacent said cupholder-receiving opening of said storage bin assembly at a position whereby when said removable cupholder is in its installed position in said opening of said storage bin said dual function cupholder ambient lighting element illuminates said removable cupholder and when said removable cupholder is not in its installed position in said opening of said storage bin said dual function cupholder ambient lighting element illuminates said storage bin; and a console wiring harness integrated with said console body, said ambient lighting elements being electrically connected with said console wiring harness, said console wiring harness being electrically attachable with the main electrical system of the motor vehicle.

12. The floor console assembly for use in a motor vehicle of claim 11, the motor vehicle having a rear passenger area, said floor console assembly including a rear end adjacent the rear passenger area and a cupholder formed in said rear end, said floor console assembly further including a rear cupholder ambient lighting element positioned in said rear end of said floor console assembly.

13. The floor console assembly for use in a motor vehicle of claim 11, the motor vehicle having a left rear footwell and a right rear footwell, said floor console assembly including a left rear footwell ambient lighting element and a right rear footwell ambient lighting element, said ambient lighting elements being electrically connected with said console wiring harness.

14. The floor console assembly for use in a motor vehicle of claim 13, wherein said ambient lighting elements are selected from the group consisting of light emitting diodes and incandescent bulbs.

\* \* \* \* \*